US008261000B2

(12) United States Patent
Kelley et al.

(10) Patent No.: US 8,261,000 B2
(45) Date of Patent: Sep. 4, 2012

(54) SINGLE LINE DOCK STATUS AUTOIDENTIFICATION

(75) Inventors: Robert Kelley, Portland, OR (US); Jonathan Betts-LaCroix, San Mateo, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 12/879,213

(22) Filed: Sep. 10, 2010

(65) Prior Publication Data
US 2011/0087818 A1   Apr. 14, 2011

Related U.S. Application Data

(63) Continuation of application No. 11/580,238, filed on Oct. 12, 2006, now abandoned.

(60) Provisional application No. 60/727,052, filed on Oct. 14, 2005.

(51) Int. Cl.
*G06F 13/00* (2006.01)
*G06F 3/00* (2006.01)

(52) U.S. Cl. ............................ 710/304; 710/16; 710/303

(58) Field of Classification Search .................. 710/8, 10, 710/15–16, 19, 301–304; 327/205; 326/22
See application file for complete search history.

(56) References Cited

U.S. PATENT DOCUMENTS

| | | | |
|---|---|---|---|
| 5,767,500 A | 6/1998 | Cordes et al. | |
| 5,875,293 A | 2/1999 | Bell et al. | |
| 5,983,288 A | 11/1999 | Visee | |
| 6,138,182 A | 10/2000 | Hennessy et al. | |
| 6,148,353 A | 11/2000 | Cho | |
| 6,223,229 B1 | 4/2001 | Kvamme | |
| 6,336,146 B1 | 1/2002 | Burridge et al. | |
| 6,384,755 B1 | 5/2002 | Hayden | |
| 6,538,640 B1 | 3/2003 | Ostrum et al. | |
| 6,567,007 B1 | 5/2003 | Fritsche et al. | |
| 6,696,922 B1 | 2/2004 | Wong et al. | |
| 2001/0032321 A1 | 10/2001 | Nanno et al. | |
| 2002/0184297 A1 | 12/2002 | Krancher et al. | |
| 2003/0199288 A1 | 10/2003 | Bodnar et al. | |
| 2003/0211836 A1 | 11/2003 | Khorram | |
| 2006/0248252 A1 | 11/2006 | Kharwa | |

OTHER PUBLICATIONS

Malvino, A.P., "Electronic Principles", 5th Edition, Glencoe/McGraw-Hill, 1993, Section 21-3, pp. 760-764, ISBN 0-02-800845-6.
Li, Paul, "Hot-Plug and Hot-Swap Bus Switches", Application Note 52, Pericom Semiconductor Corp., Jun. 13, 2002, pp. 1-4.
"CMOS Schmitt Trigger—A Uniquely Versatile Design Component", Application Note 140, Fairchild Semiconductor Corp., Jun. 1975, pp. 1-8.

*Primary Examiner* — Thomas J Cleary
(74) *Attorney, Agent, or Firm* — Morris & Kamlay LLP

(57) ABSTRACT

A single line docking station characteristic identifier is disclosed. In one embodiment, a portable computing device can include a dock detector circuit having an interface pin configured to be coupled to a docking station via a single line dock connection, where the dock detector circuit is configured to determine a characteristic of the docking station using a passive component in the docking station when the portable computing device is connected to the docking station via the single line dock connection. The dock detector circuit can include a resistor and a Schmitt trigger, while the passive component in the docking station can include a capacitor, for example.

23 Claims, 5 Drawing Sheets

SINGLE LINE DOCK STATUS AUTOIDENTIFICATION

RELATED APPLICATIONS

This is a continuation application of U.S. Ser. No. 11/580,238, filed Oct. 12, 2006, which is a non-provisional application of U.S. Provisional Application Ser. No. 60/727,052, filed Oct. 14, 2005, now expired, the contents of which are hereby incorporated by reference into this application.

FIELD OF THE INVENTION

The invention relates generally to the identification of docking devices in electronic or computer systems.

BACKGROUND

Portable computing devices, such as digital assistants, laptop computers, and cellular telephones, continue to proliferate in the marketplace. However, because many of these devices may lack some features or the accessibility found in larger desktop computing systems, docking stations may be employed to provide such enhancements, or to otherwise improve or supplement a user's experience in using the portable device.

In order to facilitate such docking station arrangements, and associated access to features, an identification of the docking station by the portable computing device may be desirable. In particular, an identification using a simplified approach and/or interface may be particularly desirable.

SUMMARY

In one embodiment, a portable computing device can include a dock detector circuit having an interface pin configured to be coupled to a docking station via a single line dock connection, where the dock detector circuit is configured to determine a characteristic of the docking station using a passive component in the docking station when the portable computing device is connected to the docking station via the single line dock connection. The dock detector circuit can include a resistor and a Schmitt trigger, while the passive component in the docking station can include a capacitor, for example.

In one embodiment, a method of determining a characteristic of a docking station can include: (i) connecting a portable computing device to the docking station via a single line dock connection, where the portable computing device includes a dock detector circuit coupled to the single line dock connection; (ii) placing the single line dock connection in a reset state using the dock detector circuit; and (iii) determining the characteristic by sampling the single line dock connection at a predetermined time.

In one embodiment, a system of determining a characteristic of a docking station can include: (i) a single line dock connection coupled to the docking station; and (ii) a portable computing device with a dock detector circuit, where the dock detector circuit is coupled to the single line dock connection, and where the dock detector circuit can determine the characteristic using a passive component in the docking station when the portable computing device is connected to the docking station via the single line dock connection.

DETAILED DESCRIPTION

Figure 1:
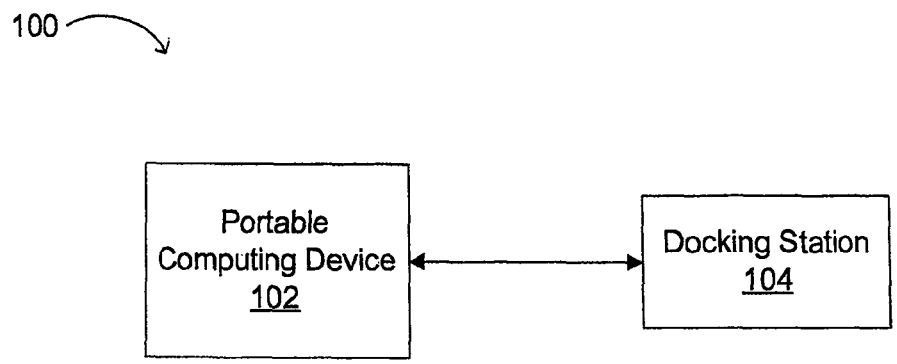
FIG. 1 illustrates an example docking system arrangement.

Referring now to FIG. 1, an example docking system arrangement is indicated by the general reference character 100. For example, portable computing device 102 can interface with docking station 104 via a dock identification or "DOCK_ID" pin interface, or any other suitable interface. Further, portable computing device 102 may be any device amenable to such dock interfacing, such as a portable processing device, wireless telephony device, or a hand-held computer, for example. Although embodiments of the invention may be described primarily with respect to such portable computing devices, features of the invention may be used in any other type of device, circuit, process or combination thereof.

A docking station can be a structure associated with a portable computing device that can remain on a desk, and that can contain hardware that is not needed when the portable computing device is not at the desk. The portable computing device can then detach from the docking station when mobility is desired. Such docking stations may typically be used to outfit a relatively light-weight portable device in order to provide more of a desktop replacement during home use. Further, docking stations can provide extra connections, such as slots for expansion cards. Thus, a docking station (e.g., 104) can attach to a portable computing device (e.g., 102) in order to provide support for extra devices, such as hard drive bays, optical drive bays, keyboard/mouse connectors (PS/2 ports), additional universal serial bus (USB) ports, PC Card slots, and external display connectors, for example.

Figure 2:
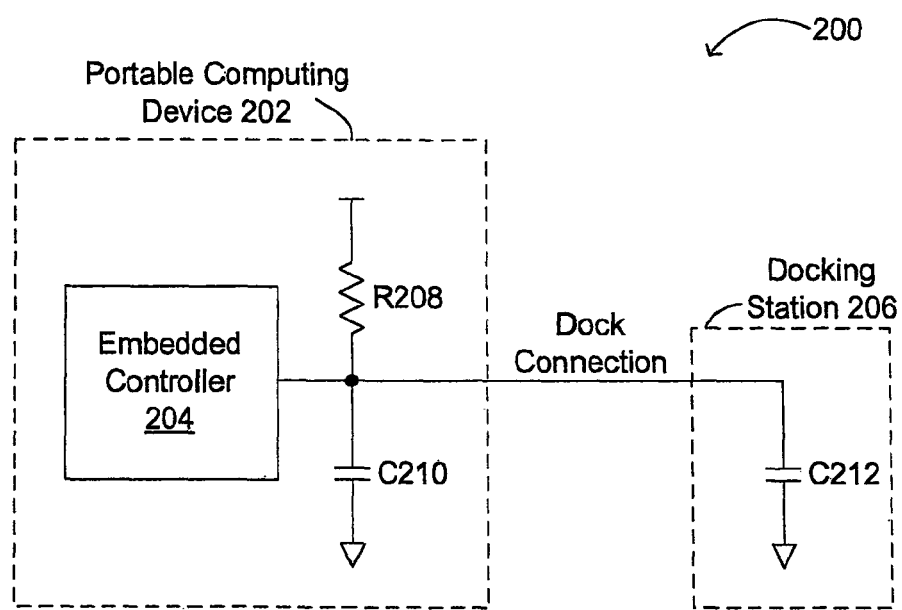
FIG. 2 shows example portable computing device and docking station circuit components in accordance with embodiments of the present invention.

Referring now to FIG. 2, example portable computing device and docking station circuit components in accordance with embodiments of the present invention is indicated by the general reference character 200. Portable computing device 202 may include embedded controller 204, and embedded controller 204 can connect to a dock connection (e.g., via a DOCK_ID pin). This dock connection can be coupled to an internal relatively weak pull-up device, such as resistor R208.

In accordance with embodiments of the present invention, a manipulation of the dock connection can be used to determine a characteristic of a docking station (e.g., docking station 206). For example, a type, such as a make, model, or version, of a docking station can be determined using a single line dock status "auto-identification" in accordance with embodiments of the present invention.

The single line dock connection may be connected to embedded controller 204 on one end and, via a DOCK_ID pin, to docking station 206 on the other end, for example. Each such docking device or station 206 may have a specific capacitance, such as capacitor C212. Such docking station capacitors can be considered a "namespace" over which the docking stations range. In general, a namespace may be an abstract container providing context for the items (e.g., names, technical terms, or words) the container holds to avoid ambiguity due to items having the same name. Accordingly, two or more items in a namespace cannot effectively share the same name, and two or more named devices in a namespace can be uniquely identified. Thus, characteristics of docking station 206 can be determined by utilizing capacitor C212, for example.

In one embodiment, a returned number of time steps taken for capacitor C212 to charge from a reset state (e.g., a substantially discharged state) can be used to determine which capacitor (i.e., capacitance value) was charged. This capacitor (e.g., C212) may then represent a definitive docking station characteristic (e.g., docking station type or state). Also, portable computing device 202 may include a calibration capacitor C210, as will be discussed in more detail below.

Figure 3:
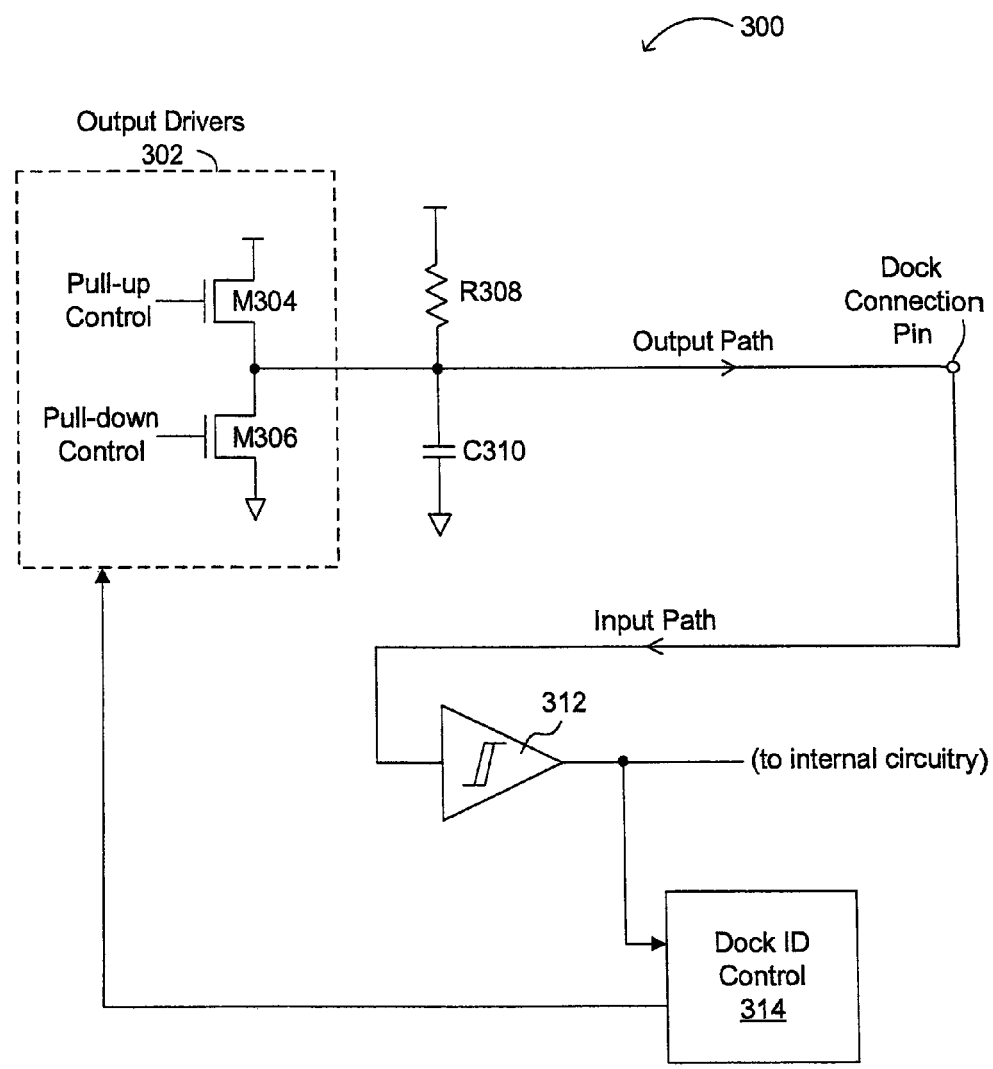
FIG. 3 shows an example schematic of dock detection circuitry in the portable computing device in accordance with embodiments of the present invention.

Referring now to FIG. 3, an example schematic of dock detection circuitry in the portable computing device in accordance with embodiments of the present invention is indicated by the general reference character 300. In this particular diagram, input and output paths within the portable computing device are shown, and a dock connection or interface pin for dock connection is also shown.

Output drivers 302 can include two NMOS transistors, M304 and M306, for example. Of course, other types of output driver circuits may also be used in accordance with embodiments. In this particular example, transistor M304 can be controlled via a gate connection to pull-up control, and transistor M306 can be controlled by a gate connection to pull-down control. Pull-up resistor R308 and calibration capacitor C310 can also connect via the output path to the dock connection pin.

The input path from the dock connection pin can include Schmitt trigger 312, or any other suitable-comparator or other input circuit that may include hysteresis, for example. Schmitt trigger 312 can provide an output to dock identification (ID) control 314, as well as to other internal circuitry. In some embodiments, dock ID control 314 may be implemented as firmware in an embedded controller (e.g., embedded controller 204 of FIG. 2). In other embodiments, dock ID control 314 may be implemented as a hardware logic block, or as a software function, for example.

In any case, dock ID control 314 may include a control mechanism for output drivers 302, such as by bringing pull-down control high in order to discharge the dock connection pin via NMOS transistor M306. Thus, in a reset operation, output drivers 302 can be employed to discharge any capacitance (e.g., in a docking station) connected to the dock connection pin.

After the docking station capacitance has been discharged via transistor M306, a predetermined waiting period can pass to allow time for the docking station capacitor to charge via resistor R308. Then, a measurement of the time taken for the voltage at the dock connection node to register as a high level can be made. This procedure may have a substantial associated variance that may be caused by process, temperature, and/or voltage variations. In one embodiment, the procedure may be accurate to within 5% due to such variance in a sensing threshold of an embedded controller input, as well as shorter or faster response times, for example.

Figure 4:
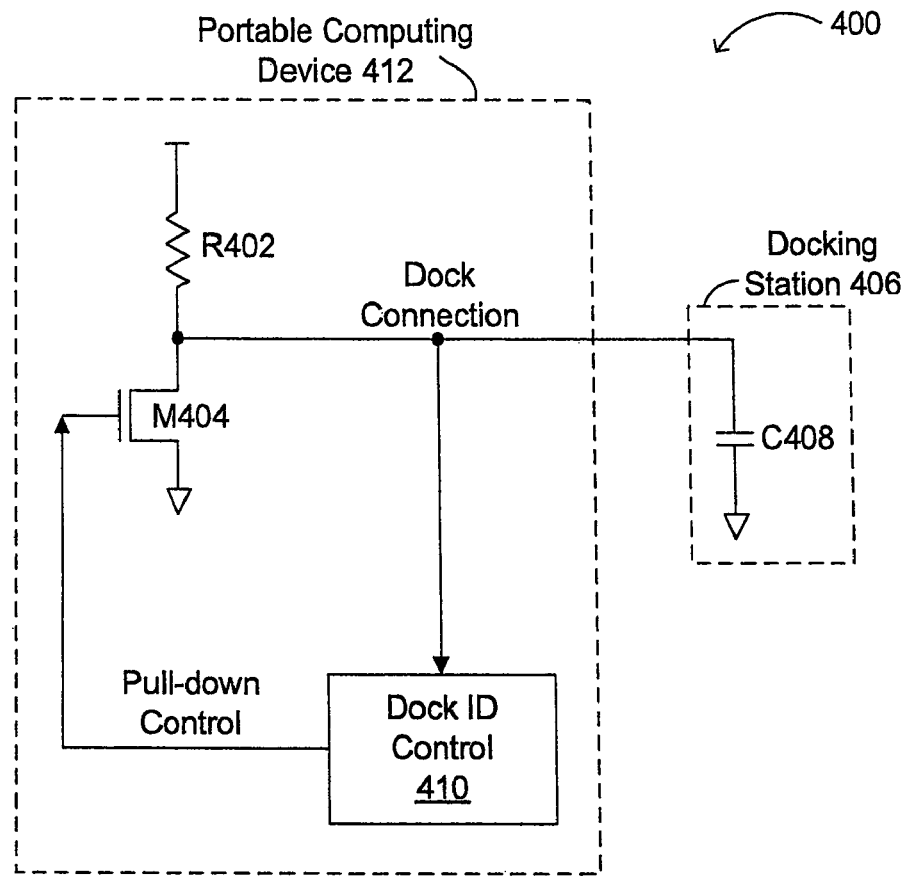
FIG. 4 shows an example of schematic details of portable computing device and docking station circuit components in accordance with embodiments of the present invention.

Referring now to FIG. 4, example schematic details of portable computing device and docking station circuit components in accordance with embodiments of the present invention is indicated by the general reference character 400. Portable computing device 412 can include pull-up resistor R402, pull-down NMOS transistor M404, and dock ID control 410. Docking station 406 may include capacitor C408, for example. As shown in this particular example, a dock connection node can connect to resistor R402, NMOS transistor M404, dock ID control 410, and docking station 406 capacitor C408. Also, dock ID control 410 can provide pull-down control to the gate of transistor M404 for resetting the single line dock connection.

Figure 5:
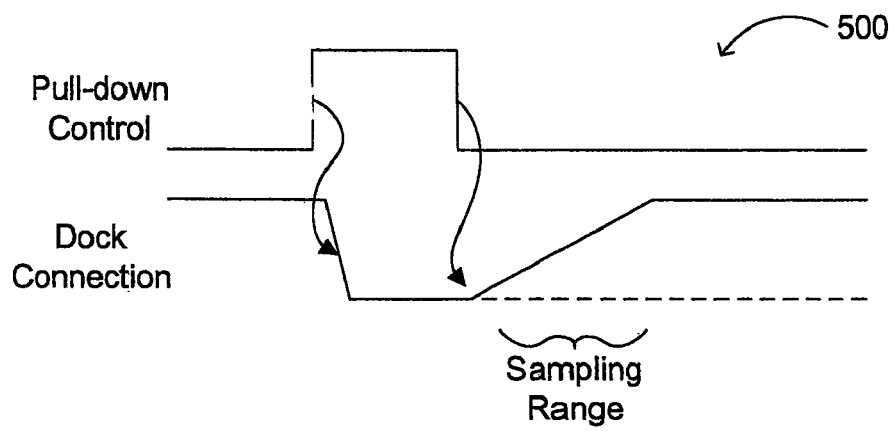
FIG. 5 shows example waveform diagrams for docking station detection using the circuit of FIG. 4.

Referring now to FIG. 5, example waveforms for docking station detection using the circuit of FIG. 4 is indicated by the general reference character 500. Pull-down control can go high to initiate a reset state, forcing dock connection to discharge via transistor M404. Thus, capacitor C408 in docking station 406 may be substantially discharged. Next, pull-down control can then return low once enough time has passed for C408 to discharge. Once pull-down control has returned low, relatively weak pull-up resistor R402 can provide a path to charge capacitor C408.

The rate of charging the single line dock connection may thus be related to the RC-time constant of resistor R402 and capacitor C408. Of course, one skilled in the art will also recognize that other parasitic capacitances and/or resistances due to other device connections (e.g., transistor M404), as well as wire paths and materials, will also affect the actual RC-time constant. As shown, a sampling range can be any suitable time period and/or threshold for determining a capacitance of C408, for example.

To allow for self-calibration or auto-calibration, one or more relatively small capacitors (e.g., C210 of FIG. 2) may be located near or in the embedded controller (e.g., 204 of FIG. 2). This calibration capacitance can allow the embedded controller to calibrate a voltage discrimination threshold when the controller first boots because the controller would be using a known capacitance value. A calibration procedure may be similar to a procedure for dock identification, except a number of time steps taken for the capacitor to charge may be returned to the embedded controller. Since the capacitor size is known (as the onboard calibration capacitor), and the voltage into the capacitor is known, one can use the time to charge this known capacitor with a known voltage to determine the voltage threshold of the embedded controller input.

A finer measurement threshold, as may be afforded by the use of such calibration capacitors, can mean that one can pack more docking station capacitor types into a range of times the dock detector system can utilize. Thus, the finer-grained discriminations the system can make between different capacitors, the shorter a range of time one would need to allow the procedure to have a same number of distinct capacitors, and thus distinct docking station identifiers. Accordingly, a degree of discrimination of the system may be directly related to a density of the namespace.

Figure 6:
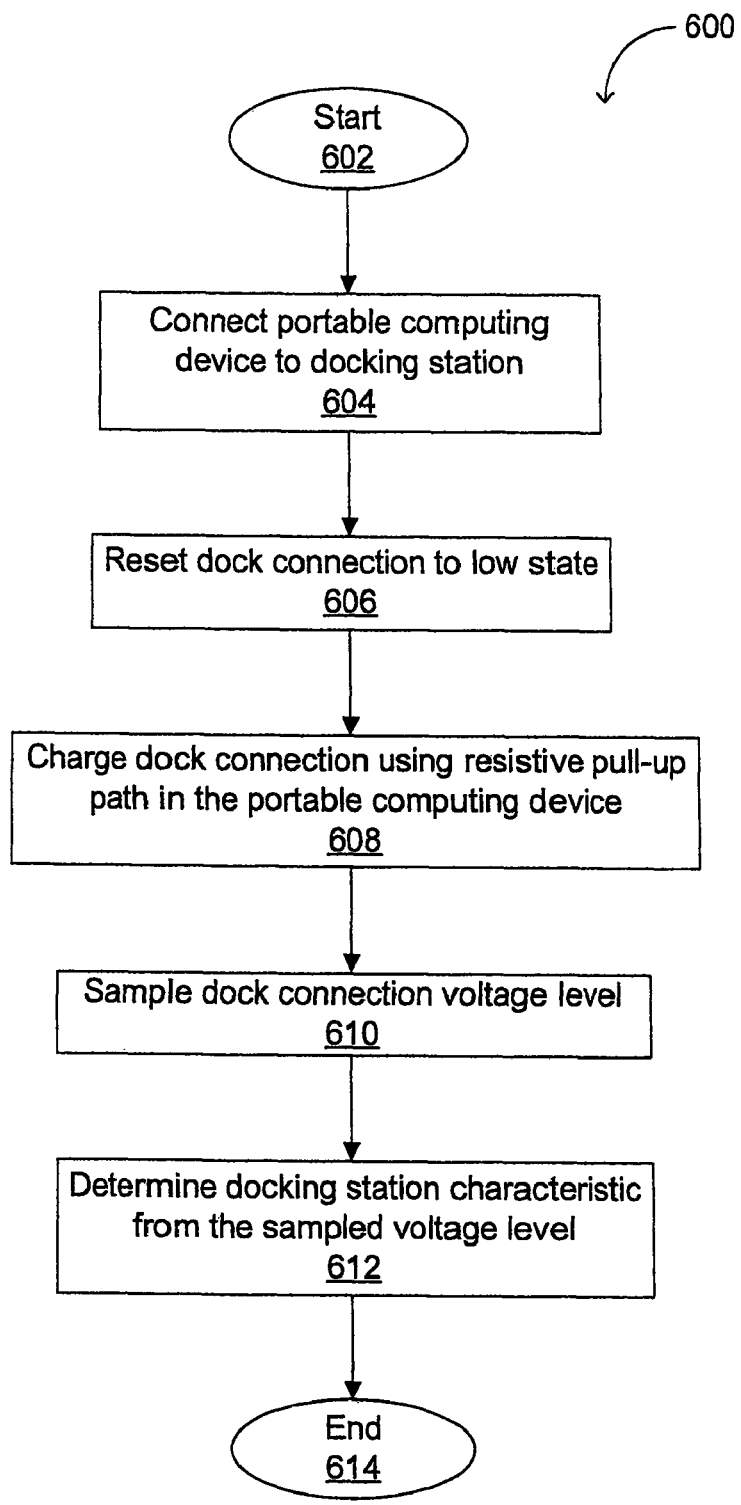
FIG. 6 shows a simplified flow diagram of an example method of detecting a docking station in accordance with embodiments of the present invention.

Referring now to FIG. 6, a simplified flow diagram of an example method of detecting a docking station in accordance with embodiments of the present invention is indicated by the general reference character 600. The flow can begin (602) and a portable computing device can be connected to a docking station (604). A dock connection between the portable computing device and the docking station can be reset, such as by discharging the docking station capacitor (606). The docking station capacitor can be allowed to charge using a resistive pull-up path in the portable computing device (608), and a voltage level of the dock connection can be sampled during or around this charging (610). Next, a docking station characteristic can be determined from this sampled voltage level (612), and the flow can complete (614).

Figure 7:
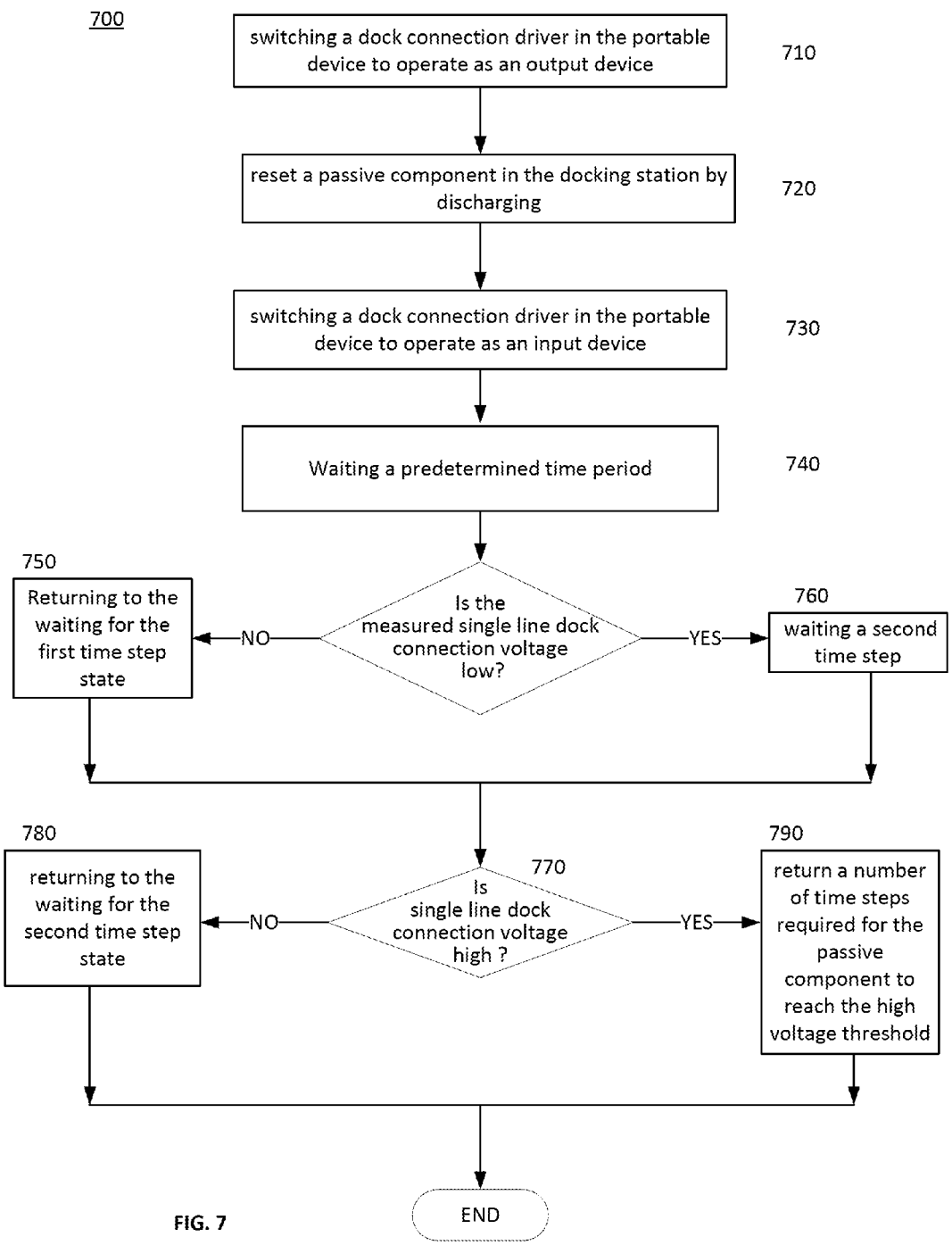
FIG. 7 shows a simplified flow diagram of another example method of detecting a docking station in accordance with embodiments of the present invention.

In accordance with embodiments of the present invention as shown in FIG. 7, another example method 700 of detecting a docking station using a single line dock connection can include: (710) switching a dock connection driver in the portable computing device to operate as an output device; (720) resetting the dock connection by discharging the line; (730) switching the dock connection input in the portable computing device to operate as an input device; (740) waiting a first time step, or predetermined time period, measuring a voltage level on the single line dock connection; (750) returning to the waiting for the first time step state if the single line dock connection is not low; (760) otherwise, waiting a second time step, or another predetermined time period, (770) measuring the voltage level on the single line dock connection and checking if that voltage level is high; (780) returning to the waiting for the second time step state if the single line dock connection is not high; and (790) otherwise, return a number of time steps required for the capacitor to be recharged, and thus to register as a high voltage level.

The following Table 1 shows example code for implementing docking station identification in accordance with embodiments of the present invention.

TABLE 1

```
goal::measure and return dock identity
    if DOCK_ID was high.
        and pulsing it low leaves it low
        therefore DOCK_ID must be open
        drive DOCK_ID low to discharge the capacitor
        until it reads low or we give up
    if DOCK_ID is stuck high!
        release DOCK_ID and return error code
        release DOCK_ID and wait for it to go high
    if DOCK_ID was low.
        and pulsing it high leaves it high
        therefore DOCK_ID must be open
    if DOCK_ID was low.
        and pulsing it high leaves it low
        therefore DOCK_ID must be grounded
```

Advantages of embodiments of the present invention can include: (i) an embedded controller in the portable computing device can use a single wire or dock connection to determine a characteristic of a docking station; (ii) no elaborate sensing or transmittal technology need be used; (iii) no analog-to-digital (ND) converter need be used; (iv) no microcontroller need be used on the docking station side; (v) a minimalist and/or simplified hardware based solution may be used in implementation; (vi) operation generally includes portable computing device measurement of a time for a dock or docking station side capacitor to charge; and (vii) a relatively simple resistor/capacitor network structure can be used. Further, such a network may be formed using either a capacitor in the docking station and a resistor in the docked device, or using a resistor in the docking station and a capacitor in the docked device, for example.

Although specific embodiments of the invention have been described, variations of such embodiments are possible and are within the scope of the invention. For example, although specific circuit devices and arrangements may be used to describe embodiments herein, other embodiments can use other devices, technologies, and/or arrangements. Embodiments of the invention can operate among any one or more processes or entities including users, devices, functional systems, and/or combinations of hardware and software.

Any suitable programming language can be used to implement the functionality of the present invention including C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments unless otherwise specified. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as standalone routines occupying all, or a substantial part, of the system processing. The functions may be performed in hardware, software or a combination of both.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. Functions and parts of functions described herein can be achieved by devices in different places and operating at different times. For example, a processor can perform its functions in "real time," "offline," in a "batch mode," etc. Parallel, distributed or other processing approaches can be used.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. For example, distributed, or networked systems, components and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

Thus, the scope of the invention is to be determined solely by the appended claims.

The invention claimed is:

1. A portable computing device, comprising:
  a dock detector circuit having a pull down circuit and an interface pin configured to be coupled to a docking station via a single line dock connection, wherein the dock detector circuit is configured to:
    reset a passive component in the docking station when the portable computing device is connected to the docking station via the single line dock connection and by operation of the pull down circuit;
    switch a dock connection driver in the portable device to operate as an input device;
    after a predetermined time period, measure a voltage level on the single line dock connection;
    in response to the measured voltage level being above a certain threshold, wait for a first time step state;
    in response to the measured voltage being at or below the certain threshold, wait a second time step; and
    return a number of second time steps for the passive component to reach a voltage above a high voltage threshold.

2. The portable computing device of claim 1, wherein the dock detector circuit comprises a resistor and a Schmitt trigger.

3. The portable computing device of claim 1, wherein the passive component in the docking station comprises a capacitor.

4. The portable computing device of claim 3, wherein the capacitor is configured to be discharged via the single line dock connection when the portable computing device is coupled to the docking station.

5. The portable computing device of claim 1, wherein the dock detector circuit comprises a calibration capacitor.

6. The portable computing device of claim 1, wherein the characteristic comprises a type of the docking station, and wherein the voltage level is related to an RC-time constant of a resistor in the dock detector circuit and a capacitor in the docking station.

7. The portable computing device of claim 6, wherein the resistor is coupled to a power supply.

8. The portable computing device of claim 1, wherein the pull down circuit comprises:
  an active device with a first terminal connected to ground, a second terminal connected to a common node, and a control terminal; and
  an impedance with a first terminal connected to a power supply and a second terminal connected the common node; wherein the single line dock connection.

9. A method of determining a characteristic of a docking station, the method comprising:
  connecting a portable computing device to the docking station via a single line dock connection, wherein the portable computing device comprises a dock detector circuit coupled to the single line dock connection, wherein the detector circuit includes a pull down circuit;
  reset a passive component in the docking station when the portable computing device is connected to the docking station via the single line dock connection, wherein the pull down circuit couples a resistor connected to a power supply and the passive device to ground;
  switching a dock connection driver in the portable device to operate as an input device;
  waiting a first time step;
  measuring a voltage level on the single line dock connection;
  in response to the measured voltage level being below a certain threshold, waiting another time period equal to the first time step;
  in response to the measured voltage being at or above the certain threshold, waiting a second time step;
  measuring the voltage level on the single line dock connection; and
  return a number of second time steps for the passive component to reach a voltage above the high voltage threshold, wherein the returned number of second time steps indicates the characteristic of the docking station.

10. The method of claim 9, wherein the dock detector circuit comprises a resistor and a Schmitt trigger.

11. The method of claim 9, wherein the connecting comprises coupling a capacitor in the docking station to the single line dock connection.

12. The method of claim 11, wherein the placing the single line dock connection in the reset state comprises discharging the capacitor using an NMOS device.

13. The method of claim 12, wherein the determining the characteristic by the sampling comprises using an RC-time constant of a resistor in the dock detector circuit and the capacitor.

14. The method of claim 9, wherein the characteristic comprises a type of the docking station.

15. The method of claim 9, wherein the portable computing device comprises an embedded controller coupled to the single line dock connection.

16. The method of claim 9, further comprising:
measuring the single line dock connection voltage; and
determining whether the measured single line dock connection voltage is above a certain threshold based on a characteristic of the passive device.

17. The method of claim 9, further comprising:
switching a dock connection driver in the portable device to operate as an output device.

18. The method of claim 9, further comprising:
in response to the measured voltage being above a high voltage threshold, waiting for a further time period equal to the second time step.

19. A system comprising:
a single line dock connection coupled to a docking station; and
a portable computing device having a dock detector circuit including a pull down circuit, wherein the dock detector circuit is coupled to the single line dock connection, and wherein the dock detector circuit is configured to:
reset a passive component in the docking station when the portable computing device is connected to the docking station via the single line dock connection and by operation of the pull down circuit;
switching a dock connection driver in the portable device to operate as an input device;
after a predetermined time period, measuring a voltage level on the single line dock connection;
in response to the measured voltage level being above a certain threshold, waiting for a first time step state;
in response to the measured voltage being at or below the certain threshold, waiting a second time step; and
return a number of second time steps for the passive component to reach a voltage above a high voltage threshold, wherein the number of second time steps indicates a characteristic of the docking station.

20. The system of claim 19, wherein the passive component in the docking station comprises a capacitor.

21. The system of claim 19, wherein the characteristic comprises a type of the docking station, and wherein the voltage level is related to an RC-time constant of a resistor in the dock detector circuit and a capacitor in the docking station.

22. The system of claim 21, wherein the capacitor is configured to be discharged via the single line dock connection upon connection to the docking station.

23. The system of claim 19, wherein the pull down circuit comprises:
an active device with a first terminal connected to ground, a second terminal connected to a common node, and a control terminal; and
an impedance with a first terminal connected to a power supply and a second terminal connected the common node; wherein the single line dock connection.

* * * * *